US008000297B2

United States Patent
Hong et al.

(10) Patent No.: US 8,000,297 B2
(45) Date of Patent: Aug. 16, 2011

(54) ACCESS ROUTER BASED MOBILE IPV6 FAST HANDOVER METHOD

(75) Inventors: Yong-Geun Hong, Daejon (KR);
Myung-Ki Shin, Daejon (KR);
Jung-Soo Park, Daejon (KR);
Hyoung-Jun Kim, Daejon (KR);
Ki-Shik Park, Daejon (KR)

(73) Assignee: Electronics and Telecommunciations Research Institute, Daejon (KR)

( * ) Notice: Subject to any disclaimer, the term of this patent is extended or adjusted under 35 U.S.C. 154(b) by 571 days.

(21) Appl. No.: 10/580,479

(22) PCT Filed: May 6, 2004

(86) PCT No.: PCT/KR2004/001044
§ 371 (c)(1),
(2), (4) Date: May 24, 2006

(87) PCT Pub. No.: WO2005/053187
PCT Pub. Date: Jun. 9, 2005

(65) Prior Publication Data
US 2007/0109997 A1 May 17, 2007

(30) Foreign Application Priority Data
Nov. 26, 2003 (KR) .................. 10-2003-0084365

(51) Int. Cl.
*H04W 4/00* (2009.01)
(52) U.S. Cl. ... 370/331; 370/328; 370/338; 370/395.32; 455/436; 455/437; 455/442; 709/217; 709/218; 709/219
(58) Field of Classification Search ....... 455/432.1–442, 455/450, 509, 516; 370/331–338, 341, 469, 370/351, 328, 395.32; 726/5, 18, 19, 28, 726/29; 709/217–220
See application file for complete search history.

(56) References Cited

U.S. PATENT DOCUMENTS
5,822,313 A * 10/1998 Malek et al. .............. 370/332
(Continued)

FOREIGN PATENT DOCUMENTS
KR 1020020023918 A 3/2002
(Continued)

OTHER PUBLICATIONS

"Improved Handover Performance in Wireless Mobile IPv6." Cornall et al. © 2002 IEEE. Clayton, Australia. pp. 857-861.
"Design of Broadband IPv6/IPv4 Dual-Stack Access Router Based on Service Stream." Gao et al. © 2003 IEEE. Beijing, China. pp. 2-6.
"A Client-based Handoff Mechanism for Mobile IPv6 Wireless Networks." Patanapongpibul et al. © 2003 IEEE. pp. 7-12.

*Primary Examiner* — Kamran Afshar
*Assistant Examiner* — Babar Sarwar
(74) *Attorney, Agent, or Firm* — Ladas & Parry LLP

(57) ABSTRACT

Provided is a mobile IPv6 fast handovers method, which includes the steps of: a) if a mobile node is moved in a layer 2, receiving a modified RS message from a mobile node in the access router, b) detecting movement of the mobile node in a layer 3 in the access router, c) if the mobile node makes a movement in the layer 3, generating CoA of the mobile node in the access router; d) performing Duplicate Address Detection in the access router to inspect uniqueness of the generated CoA; and e) transmitting a modified RA message to the mobile node in the access router. The Fast Handovers method of the present research performs fast movement detection by using layer 2 information simply and efficiently for fast handover in the mobile IPv6 and generates CoA in the access router instead of the mobile node without operations of many additional messages.

5 Claims, 4 Drawing Sheets

U.S. PATENT DOCUMENTS

| | | | |
|---|---|---|---|
| 5,845,265 A * | 12/1998 | Woolston | 705/37 |
| 6,058,431 A * | 5/2000 | Srisuresh et al. | 709/245 |
| 6,088,587 A * | 7/2000 | Abbadessa | 455/424 |
| 6,195,705 B1 * | 2/2001 | Leung | 709/245 |
| 6,243,581 B1 * | 6/2001 | Jawanda | 455/432.2 |
| 6,473,413 B1 | 10/2002 | Chiou et al. | |
| 6,930,988 B2 * | 8/2005 | Koodli et al. | 370/331 |
| 6,947,401 B2 * | 9/2005 | El-Malki et al. | 370/331 |
| 6,987,771 B2 * | 1/2006 | Shimizu et al. | 370/401 |
| 7,023,828 B2 * | 4/2006 | Korus et al. | 370/338 |
| 7,123,599 B2 * | 10/2006 | Yano et al. | 370/331 |
| 7,222,188 B1 * | 5/2007 | Ames et al. | 709/238 |
| 7,286,671 B2 * | 10/2007 | Yegin et al. | 380/270 |
| 7,313,628 B2 * | 12/2007 | Chaskar et al. | 709/238 |
| 7,436,804 B2 * | 10/2008 | O'Neill | 370/331 |
| 7,573,890 B2 * | 8/2009 | Shahrier et al. | 370/400 |
| 2002/0006133 A1 * | 1/2002 | Kakemizu et al. | 370/401 |
| 2003/0087646 A1 * | 5/2003 | Funato et al. | 455/456 |
| 2003/0104814 A1 * | 6/2003 | Gwon et al. | 455/436 |
| 2003/0225892 A1 * | 12/2003 | Takusagawa et al. | 709/227 |
| 2004/0066757 A1 * | 4/2004 | Molteni et al. | 370/329 |

FOREIGN PATENT DOCUMENTS

| | | |
|---|---|---|
| KR | 1020040070891 A | 8/2004 |
| KR | 1020050027822 A | 3/2005 |
| WO | WO 03/092316 | 11/2003 |

\* cited by examiner

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|C|                          Reserved                            |
+-+-+-+-+-+-+-+-+-+-+-+-+-+-+-+-+-+-+-+-+-+-+-+-+-+-+-+-+-+-+-+-+
|    Source link-layer address options
+-+-+-+-+-+-+-+-+-+-+-+-
|
```

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
| Cur Hop Limit |M|O|H|C|Res... |         Router Lifetime       |
+-+-+-+-+-+-+-+-+-+-+-+-+-+-+-+-+-+-+-+-+-+-+-+-+-+-+-+-+-+-+-+-+
|                         Reachable Time                        |
+-+-+-+-+-+-+-+-+-+-+-+-+-+-+-+-+-+-+-+-+-+-+-+-+-+-+-+-+-+-+-+-+
|                          Retrans Timer                        |
+-+-+-+-+-+-+-+-+-+-+-+-+-+-+-+-+-+-+-+-+-+-+-+-+-+-+-+-+-+-+-+-+
|   Prefix Information options
+-+-+-+-+-+-+-+-+-+-+-+-+-
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     | Prefix Length |L|A|R|C|Res..  |
+-+-+-+-+-+-+-+-+-+-+-+-+-+-+-+-+-+-+-+-+-+-+-+-+-+-+-+-+-+-+-+-+
|                         Valid Lifetime                        |
+-+-+-+-+-+-+-+-+-+-+-+-+-+-+-+-+-+-+-+-+-+-+-+-+-+-+-+-+-+-+-+-+
|                       Preferred Lifetime                      |
+-+-+-+-+-+-+-+-+-+-+-+-+-+-+-+-+-+-+-+-+-+-+-+-+-+-+-+-+-+-+-+-+
|                           Reserved2                           |
+-+-+-+-+-+-+-+-+-+-+-+-+-+-+-+-+-+-+-+-+-+-+-+-+-+-+-+-+-+-+-+-+
|                            Prefix                             |
+-+-+-+-+-+-+-+-+-+-+-+-+-+-+-+-+-+-+-+-+-+-+-+-+-+-+-+-+-+-+-+-+
```

ACCESS ROUTER BASED MOBILE IPV6 FAST HANDOVER METHOD

TECHNICAL FIELD

The present invention relates to an access router-based mobile IPv6 fast handover method; and, more particularly, to a fast handover method that can perform movement detection quickly based on layer 2 information to reduce delay time in mobile IPv6 handover and generate Care of Address (CoA) in an access router instead of a mobile node.

BACKGROUND ART

Along the development of mobile communication technology and technology for manufacturing mobile terminals, e.g., a mobile computer and a personal digital assistant (PDA), the Internet is applied to the next-generation wireless technology in support of mobility. Current wired Internet connection which is adopted in offices and schools is changed into wireless communication of 802.11 or wireless communication using Bluetooth or infrared communication.

Herein, 802.11 is a collection of specifications for wireless Local Area Network (LAN) developed by an Institute of Electrical and Electronics Engineers (IEEE) working group.

Generally, a wireless LAN is technology that replaces the wired environment from a hub to a subscriber end into wireless environment which is favorable for set up and mobility in the construction of a network.

The wireless LAN has an advantage that a network can be built in a short time compared to a wired LAN, because the wireless LAN uses radio frequencies from access point (AP) equipment to a mobile node (MN), instead of using cable to build the network. It also has an advantage that it is not limited to a fixed desktop environment and, it makes it possible to perform communication with a laptop computer and a personal computer (PC) card, while a user is moving.

At present, portable mobility is provided to work sites by mounting a wireless LAN card in a laptop computer, and the demand for the portable mobility is increasing. Besides, a variety of Internet Protocol (IP)-based services appear in a mobile communication system, which also increases a demand for an IP mobility service.

FIG. 1 is a block diagram showing a network where a user accesses to the Internet by using a wireless LAN. The present invention is applied to the network of FIG. 1.

As shown in FIG. 1, the network to which the present invention is applied includes the Internet 10, access routers 21 and 22, access points 31, 32, 33 and 34, and mobile nodes 40.

As shown from the arrows of FIG. 1, if the mobile node 40 moves from the current access point 32 area to another access point 33 area, the mobile node 40 determines whether there is handover from the current access router 21 and if it is determined that there is handover, a handover process is carried out by acquiring layer 3 information on the access router 22 of a new area.

Diverse data link layer technologies supporting wireless communication including 802.11 can be used for the layer 2 of a mobile node using mobile IPv6.

In the 802.11 wireless LAN environments which is used most commonly at present, a laptop computer or a PDA equipped with a wireless LAN card perform layer-2 communication with an access point that plays a role of a base station in a cellular system. In the Windows operating system or a wireless LAN card driver module of Linux, it determines re-establishment to a new access point by periodically checking the intensity of signals with the access point.

Meanwhile, the Internet Engineering Task Force (IETF) standardizes the mobile IP technology which supports mobility in addition to the existing IP technology. Herein, the IETF is a body that defines standards of Internet operating protocols such as Transmission Control Protocol/Internet Protocol (TCP/IP). The standards are presented in the form of Requests for Comments (RFC).

The design purpose of the mobile IPv6 is to provide mobility while using the functions of the IPv6. The mobile IPv6 provides the mobility more effectively than the mobile IPv4 and excellent extensibility.

That is, the mobile IPv6 can form location information of a mobile node automatically by using a neighbor discovery function and an address auto-configuration function, when the mobile node moves to a new network area. It also removes some signal messages and agents which should exist in the IPv4 by defining a new destination option to inform the location information on its movement to the new node in need of its location information. In addition, it provides a protocol for route optimization as a basic function.

However, the mobile IPv6 has as long delay time in the handover process, which is formed of a movement detection process for detecting that the mobile node is moved to a new network area, a new CoA configuration process, and a Duplicate Address Detection (DAD) process for checking the uniqueness of the newly generated address, affects a real-time service or other delay-sensitive services.

Herein, the CoA is a routable address of a mobile node having a subnet prefix of the new network, when the mobile node is moved to another network.

Therefore, the IETF has developed several handover mechanisms to reduce the time delay during handover, and one of them is mobile IPv6 fast handovers for which is dealt with in the mobile IP working group (Mobileip WG) of the IETF.

FIG. 2 is a flowchart describing the mobile IPv6 fast handovers of the IETF which is defined in the mobile IPv6 IETF fast handovers for standard documents.

First, if the mobile node 40 moves to a wireless LAN area of the new access router 22, at step 11, the mobile node 40 transmits a Router Solicitation for Proxy Advertisement (Rt-SolPr) message to the current access router 21 to perform handover from the current access router 21 to the new access router 22.

At step 12, the current access router 21 which receives the RtSolPr message adds a new CoA to be used in the new network to a Proxy Router Advertisement (PrRtAdv) message and transmits it to the mobile node 40. Then, at step 13, it transmits a Handover Initiate (HI) message containing the new CoA and the current CoA of the mobile node 40 to the new access router 22 which is the object of the handover.

Also, it prepares to perform packet forward or packet tunneling to send a packet taking the current CoA of the mobile node 40 as a destination address to the access router 22 which is the object of the handover.

Meanwhile, at step 14, the access router 22, which is the object of the handover and receives the HI message, checks whether the new CoA of the mobile node 40 is available and transmits a HACK message in response to the checking result. If Uflag is set up in the HI message, packets transmitted from the current access router 21 begin to be buffered.

In tunneling, the source address of external packets is the address of the current access router 21 and the destination address is the new access router 22 which is the object of the handover.

Meanwhile, at step 15, the mobile node 40 which receives the PrRtAdv message transmits F-BU message to the current access router 21 in response to the PrRtAdv message. The F-BU message is the final message transmitted from the current access router 21 area before the mobile node 40 performs layer 2 handover. The current access router 21 which receives the message begins to forward packets or perform tunneling.

At step 16, the current access router 21, which receives the HACK message, transmits an F-BACK message on whether the HACK message is to be used as a new CoA of the mobile node 40 to the mobile node 40. The message can be transmitted to the new access router.

Meanwhile, if the new CoA cannot be used in the new access router 22, the mobile node 40 receives an RA (Router Advertisement) message which is used in the new access router 22 area by using the current CoA and performs the general processes of mobile IPv6 CoA acquisition and binding.

If the mobile node 40 does not receive the F-BACK message from the current access router 21, it performs layer-2 handover into the new access router 22 area. After the mobile node 40 accesses to the access point of the new access router 22, at step 17, it transmits an F-NA message to the new access router 22 regardless of whether the F-BACK message is received, after the mobile node 40 accesses to the access point of the new router 22.

After the mobile node 40 accesses to the access point of the new router 22, layer 2 link up trigger is caused in the access point. The new access router 22 which receives the layer 2 link up trigger replaces it with F-NA. Herein, packets buffered in the new access router 22 are transmitted to the mobile terminal 40. If there is no link up trigger, the F-NA message performs the function instead.

Meanwhile, the new access router 22 which receives the F-NA message transmits an F-NA acknowledge message and inform the mobile node 40 of whether the new CoA is available or not. If the new CoA is available, the mobile node 40 performs the general mobile IPv6 binding process by using the address. Otherwise, if the new CoA is not available, the mobile node 40 receives a Router Advertisement (RA) message and performs the general process of mobile IPv6 CoA acquisition and binding based on the address.

Therefore, in order to perform the mobile IPv6 fast handovers of the IETF, messages including the Router Solicitation for Proxy Advertisement (RtSolPr), Proxy Router Advertisement (PrRtAdv), Handover Initiate (HI), Fast Binding Update (F-BU), Fast Binding Acknowledgement (F-BACK) messages should be realized additionally and the problem is that their operation processes are complicated.

Also, many mechanisms for performing fast handover researched in the IETF mobile IP working group are suggested to reduce delay in one area among three areas, which are movement detection, new CoA configuration, and binding update. The mobile IPv6 fast handovers, which is in progress as the current IETF mobile IP working group document is technology that reduces the entire handover delay time in the layer 3 by quickly detecting movement and configuring a new CoA based on handover expectation information in the layer 2.

In short, it supports real-time service by performing part of the layer 3 handover or delaying layer 3 registration by using a bidirectional tunnel based on the handover expectation information in the layer 2 to minimize the delay in handover before the layer 2 handover is completed. However, this method, too, has a problem that it is hard to obtain expectation information of the new network area by using the information of the layer 2 before the mobile node 40 moves to the new network area.

DISCLOSURE

Technical Problem

It is, therefore, an object of the present invention to provide a router access-based mobile IPv6 fast handover method that can detect movement by using layer 2 data efficiently for fast handover in the mobile IPv6 and generate CoA in an access router instead of a mobile terminal without operation of many messages.

Technical Solution

In accordance with one aspect of the present invention, there is provided a method for performing mobile IPv6 fast handover based on an access router (AR), which includes the steps of: a) if a mobile node is moved in a layer 2, receiving a modified RS message from a mobile node (MN) in the access router; b) detecting movement of the mobile node in a layer 3 in the access router based on the modified RS message transmitted from the mobile node in the access router; c) if the mobile node moves in the layer 3, generating a new Care of Address (CoA) of the mobile node in the access router; d) performing Duplicate Address Detection (DAD) in the access router to inspect uniqueness of the generated CoA; and e) transmitting a modified Router Advertisement (RA) message, which corresponds to the modified RS message transmitted from the mobile node, to the mobile node in the access router.

DESCRIPTION OF DRAWINGS

The above and other objects and features of the present invention will become apparent from the following description of the preferred embodiments given in conjunction with the accompanying drawings, in which:

FIG. 4 is a diagram illustrating a format of a modified Router Solicitation (RS) message in accordance with an embodiment of the present invention;

FIG. 5 is a diagram illustrating a format of a modified Router Advertisement (RA) message in accordance with an embodiment of the present invention; and FIG. 6 is a diagram illustrating a format of a Prefix Information Option of the RA message in accordance with an embodiment of the present invention.

BEST MODE FOR THE INVENTION

Figure 1:
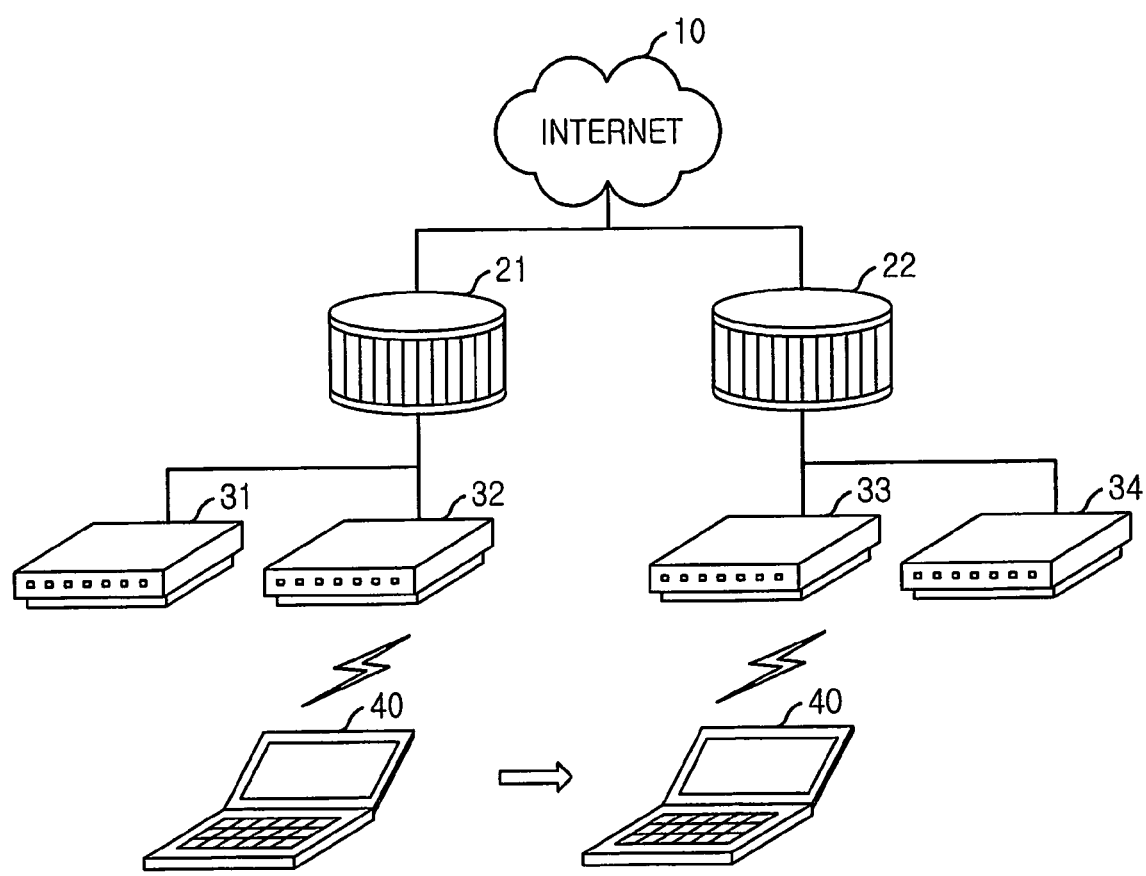
FIG. 1 is a diagram illustrating a network, to which the present invention is applied, the network where mobile nodes accessing to the Internet through a wireless Local Area Network (LAN)
Figure 2:
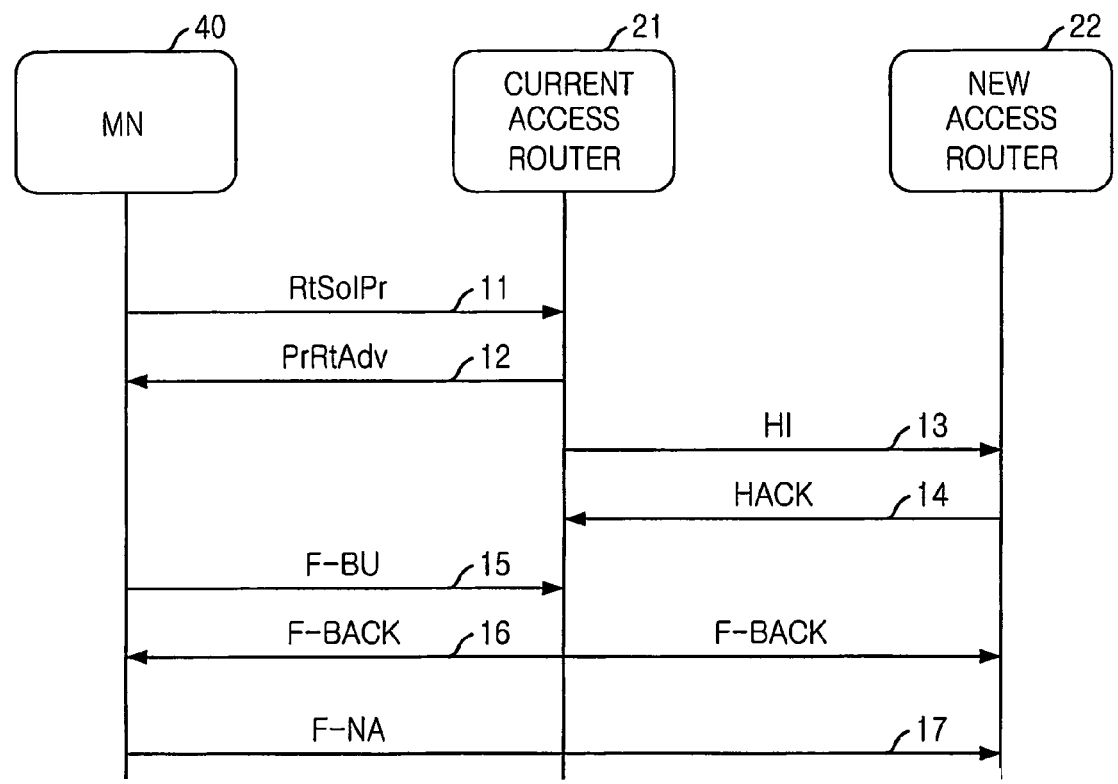
FIG. 2 is a flowchart describing a fast handovers for mobile IPv6 of an Internet Engineering Task Force (IETF), which is defined in an IETF 'Fast Handover for Mobile IPv6' standard document.

Other objects and aspects of the invention will become apparent from the following description of the embodiments with reference to the accompanying drawings, which is set forth hereinafter.

Following description exemplifies only the principles of the present invention. Even if they are not described or illustrated clearly in the present specification, one of ordinary skill in the art can embody the principles of the present invention and invent various apparatuses within the concept and scope of the present invention.

The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

Other objects and aspects of the invention will become apparent from the following description of the embodiments with reference to the accompanying drawings, which is set forth hereinafter. The same reference numeral is given to the same element, although the element appears in different drawings. In addition, if further detailed description on the related prior arts is determined to blur the point of the present invention, the description is omitted. Hereafter, preferred embodiments of the present invention will be described in detail with reference to the drawings.

Figure 3:
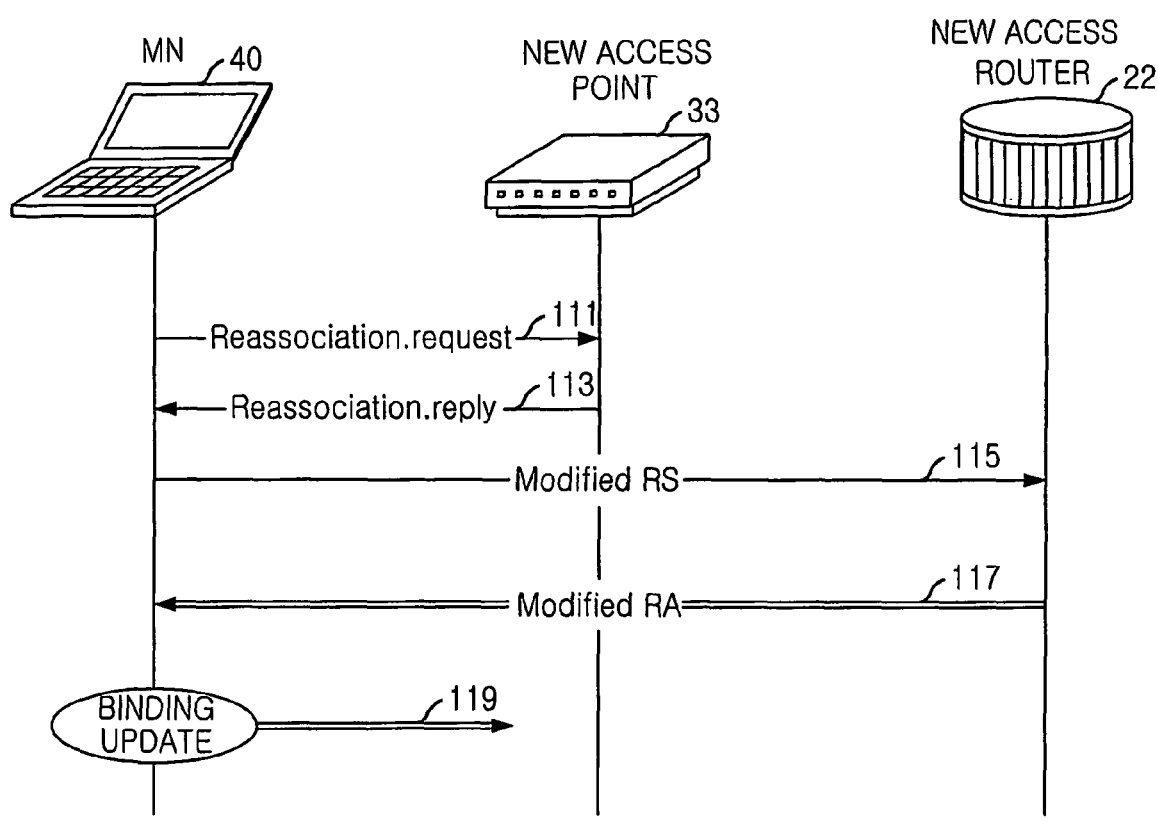
FIG. 3 is a flowchart describing an access router-based mobile IPv6 fast handover process using layer 2 data in accordance with an embodiment of the present invention.

FIG. 3 is a flowchart describing an access router-based mobile IPv6 fast handover process using layer 2 data in accordance with an embodiment of the present invention.

In the fast handover, it informs the completion of the layer 2 handover to the layer 3 as soon as the layer 2 handover is completed to carry out layer 3 movement detection as quickly as possible after the layer 2 handover information.

This is possible by exchanging a Reassociation.request message and a Reassociation.reply message which are defined in the 802.11 standard of the layer 2 between the mobile node and the new access point at steps 111 and 113.

The layer 3 network of the mobile node receives the layer 2 information, informs the completion of the layer 2 handover to the access router, and requests a process of layer 3 movement detection and a process of forming CoA and performing DAD.

This is carried out by transmitting a modified RS message having a message format illustrated in FIG. 4 to the new access router at step 115.

In the modified RS message, a 'C' flag signifying the generation of CoA is set. The 'C' flag transmits a layer 2 identifier by using a source link-layer address option and processes the modified RS message for fast handover, different from a general RS message.

The unsolicited transmission of the modified RS message after the completion of the layer 2 handover occurs in the mobile node earlier than any other operations of the mobile node and it occurs independently from an application program.

If the access router receives the modified RS message from the mobile node, it compares its neighbor cache value with the layer 2 identifier of the mobile terminal included in the RS message and detects movement in the layer 3.

Herein, two cases can be considered.

A first one is a case where the layer 2 identifier is not in the neighbor cache value. This signifies that the mobile terminal is a new comer entering a subnet area under the control of the access router.

Therefore, the access router carries out a process of configuring CoA and performing DAD subsequently.

The second one is a case where the layer 2 identifier is in the neighbor cache value. This means that the mobile terminal is already serviced by the access router.

That is, although layer 2 movement is made, the layer 3 movement is yet made.

This is a case where two different access points are connected to the same access router and transmits a Router Advertisement (RA) message that belongs to the same subnet. In this case, the process of configuring CoA and performing DAD is not needed. Instead, this is informed to the mobile node so that the mobile node continues to use the current CoA of the mobile terminal.

If the access router compares the neighbor cache with the layer 2 identifier value of the mobile node and if it is found out that the movement is made into the layer 3, the access router generates a new CoA as a router based on a prefix information and the layer 2 identifier of the mobile node included in the RS message.

The access router generates a new CoA by using a general IPv6 mechanism as defined in the Internet Engineering Task Force (IETF) IPv6 stateless address auto-configuration.

After the generation of the new CoA, the access router performs the DAD process to inspect the uniqueness of the new CoA.

If the access router receives the RS message of the mobile node and performs the movement detection, the CoA configuration, and the DAD process, the access router transmits the newly generated CoA by transmitting a modified RA message having a message format of FIG. 5 at step 117.

The modified RA message uses a 'C' flag which means 'CoA Generate' to be distinguished from the existing RA message.

If the mobile node receives the modified RA message from the access router, it can use the CoA as its network interface address.

Since the DAD process is already performed in the access router, the mobile node performs binding update by using the CoA as its new network interface address without additional DAD process at step 119.

The 'C' flag is added in order to discriminate existing options from the prefix information options. Therefore, the IPv6 address included in the prefix information option indicates the newly generated CoA in the access router.

FIG. 6 shows a format of a prefix information option which is modified by adding the 'C' flag.

If the layer 2 handover is performed but the layer 3 handover is not carried out, the access router includes a predetermined address in the prefix information option and informs the mobile node of the predetermined address.

The method of the present invention can be embodied as a program and stored in a computer-readable recording medium, such as CD-ROM, RAM, ROM, floppy disks, hard disks, and magnetooptical disks.

While the present invention has been described with respect to certain preferred embodiments, it will be apparent to those skilled in the art that various changes and modifications may be made without departing from the scope of the invention as defined in the following claims.

The present invention can reduce delay in handover by utilizing layer 2 handover information actively and performing the movement detection, the CoA configuration, and the DAD process in the access router, and miniaturize mobile nodes and manufacture lightweight mobile nodes by performing the processing in the access router to thereby reduce load on the mobile node.

What is claimed is:

1. A method for performing mobile IPv6 fast level 2 handover between access points (APs) and a mobile node (MN) and optionally performing layer 3 handover between access routers (ARs) and the MN, each AR having a subnet composed of at least one access point (AP) that can interface between the MN and each corresponding AR, the method comprising the steps of:

receiving, at a given AR, a modified Router Solicitation (RS) message from the MN after completion of a layer 2 handover between the MN and a newly connected AP, the modified RS message having a message format comprising a 'C' flag used for signifying that a current Care of Address (CoA) is set and comprising a source link-layer address option used for indicating a layer 2 identifier of the MN;

transmitting, from the given AR, a general Router Advertisement (RA) message to the MN when the layer 2 identifier from the source link-layer address option of the modified RS message is found to be in a neighbor cache value of the given AR which corresponds to layer 2 handover of the MN between a previously connected AP to the newly connected AP such that the previously connected AP and the newly connected AP both belong to the same subnet of the given AR;

continuing to use the current CoA as a new interface address when the layer 2 identifier from the source link-layer address option of the modified RS message is found to be in the neighbor cache value of the given AR;

generating, at the given AR a modified RA message when the layer 2 identifier from the source link-layer address option of the modified RS message is found not to be in the neighbor cache value of the given AR such that the modified RA message comprises a new CoA which corresponds to when layer 3 handover of the MN occurs between the previous connected AP and the newly connected AP such that the previously connected AP does not belong to a subnet of the given AR and the newly connected AP belongs to the subnet of the given AR;

replacing the current CoA with the new CoA as the new network interface address when the layer 2 identifier from the source link-layer address option of the modified RS message is found not to be in the neighbor cache value of the given AR;

performing, at the given AR a Duplicate Address Detection (DAD) process only when the layer 2 identifier from the source link-layer address option of the modified RS message is found not to be in the neighbor cache value of the given AR, such that the DAD process is used to inspect a uniqueness of the new CoA wherein the performing step is performed subsequent to the generating step; and transmitting, from the given AR to the MN, a modified RA message containing the new CoA to update a network address of the MN, wherein the transmitting step is performed subsequent to the performing step.

2. The method as recited in claim 1, wherein the MN transmits the modified RS as soon as the layer 2 handover is complete.

3. The method as recited in claim 2, wherein movement of the MN in layer 3 is detected by the given AR when the given AR determines that the previously connected AP does not belong to the subnet of the given AR.

4. The method as recited in claim 1, wherein the modified RA message includes a flag which signifies the generation of the new CoA.

5. The method as recited in claim 1, wherein the MN does not perform the DAD process after receiving the modified general RA message.

* * * * *